J. S. SCOTT.
FISHING FLOAT.
APPLICATION FILED SEPT. 17, 1915.

1,167,222.

Patented Jan. 4, 1916.

Witnesses

John S. Scott
Inventor,
by C. A. Snow & Co.
Attorneys.

UNITED STATES PATENT OFFICE.

JOHN S. SCOTT, OF GREENVILLE, TEXAS.

FISHING-FLOAT.

1,167,222.  Specification of Letters Patent.  Patented Jan. 4, 1916.

Application filed September 17, 1915. Serial No. 51,241.

*To all whom it may concern:*

Be it known that I, JOHN S. SCOTT, a citizen of the United States, residing at Greenville, in the county of Hunt and State of Texas, have invented a new and useful Fishing-Float, of which the following is a specification.

The present invention appertains to fishing floats, and aims to provide a fishing float having novel and improved means for frictionally clamping the line within the float, so that the float can be adjusted readily along the line whenever desired, the present device being an improvement over the fishing bob disclosed in my Patent No. 740,474, issued October 2, 1903.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1:
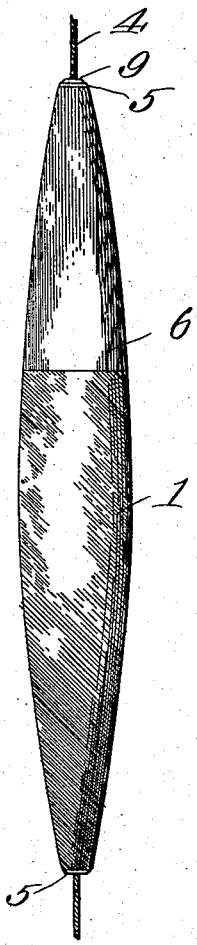
Figure 2:
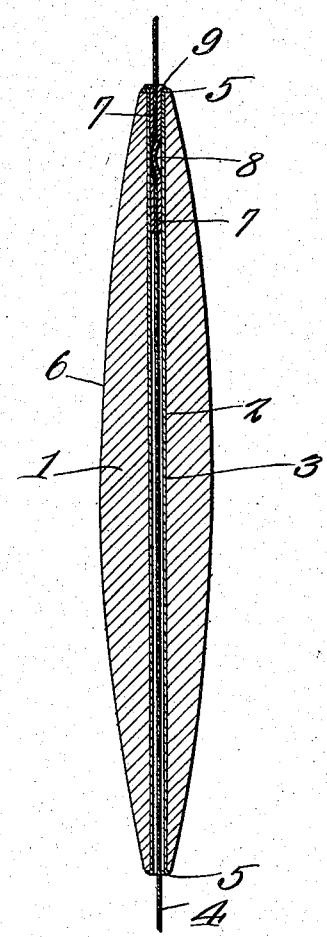
Figure 3:
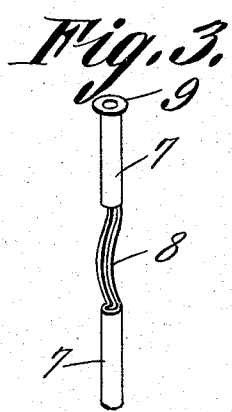

Figure 1 is a side elevation of the float or bob. Fig. 2 is a longitudinal section thereof. Fig. 3 is an enlarged perspective view of the line fastener or clamp.

The float or bob 1, which is of fusiform contour as illustrated, although it may be of any suitable shape, is provided with a longitudinal line receiving bore 2, in which is fitted a tube 3 of brass or other suitable material, the float or bob being of any suitable buoyant material. The tube 3 has the fishing line 4 passed therethrough, and the ends of the tube 3 are flanged over the ends of the float or bob, as at 5, thus securely fastening the tube within the float. The surface of the float 1 is preferably painted, enameled, or otherwise finished, as at 6, for purpose of wear and appearance.

The line fastener or clamp is formed from a short tube, and is fitted within one end of the tube 3, the fastener embodying two spaced tubular sections 7 fitting snugly within the tube 3 and connected by a bowed strip-like portion 8. The portion 8 connects corresponding sides of the sections 7 and is bowed between the adjacent ends of said sections toward the opposite sides of said sections so as to tend to bear against that wall of the tube 3 opposite the wall adjacent which the terminals of the bowed portions 8 are arranged. The outer section 7 is provided at its outer end with an outturned flange 9 seating upon the respective flange 5 of the tube 3, to prevent the fastener being forced too far into the tube 3, and to enable the fastener to be withdrawn when desired or necessary.

The line 4 passes through the tubular sections 7, and is clamped between the resilient bowed portion 8 and the respective wall of the tube 3, whereby the line is frictionally held. The portion 8 may be curved transversely slightly to provide a concavature for receiving the line, to avoid the liability of the line being disengaged from the convexed side of the portion 8. The spring portion 8 normally prevents the movement of the float upon the line, but when the line and float are moved by hand relative to one another, the line can slide past the portion 8 without difficulty, there being little if any wear upon the line when it is drawn through the float. The present float can be readily shifted along the line to the point desired, the advantages of which will be apparent to the fisherman.

What is claimed is:

1. A fishing float having a line receiving bore, and a line fastener embodying a pair of tubular sections fitted in said bore for the passage of the line therethrough and having a resilient line clamping portion connecting them.

2. A fishing float having a line receiving bore, and a line fastener embodying a pair of tubular sections fitted within said bore and having a resilient bowed portion connecting their adjacent ends for clamping the line within the bore.

In testimony that I claim the foregoing as my own, I have hereto affixed my signature in the presence of two witnesses.

JOHN S. SCOTT.

Witnesses:
H. M. KENNEDY,
JAMES MITCHELL.

Copies of this patent may be obtained for five cents each, by addressing the "Commissioner of Patents, Washington, D. C."